(12) United States Patent
Saito (10) Patent No.: US 10,771,099 B2
(45) Date of Patent: Sep. 8, 2020

(54) RADIO INTERFERENCE STATION ELIMINATION DEVICE, RECEIVER, AND RADIO INTERFERENCE STATION ELIMINATION METHOD

(71) Applicant: MITSUBISHI ELECTRIC CORPORATION, Tokyo (JP)

(72) Inventor: Daisuke Saito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 111 days.

(21) Appl. No.: 16/088,151

(22) PCT Filed: May 30, 2016

(86) PCT No.: PCT/JP2016/065913
§ 371 (c)(1),
(2) Date: Sep. 25, 2018

(87) PCT Pub. No.: WO2017/208303
PCT Pub. Date: Dec. 7, 2017

(65) Prior Publication Data
US 2020/0235766 A1    Jul. 23, 2020

(51) Int. Cl.
*H04H 20/71* (2008.01)
*H04B 1/00* (2006.01)
*H04B 1/10* (2006.01)

(52) U.S. Cl.
CPC .................. *H04B 1/1027* (2013.01)

(58) Field of Classification Search
CPC combination set(s) only.
See application file for complete search history.

(56) References Cited

U.S. PATENT DOCUMENTS

| | | | |
|---|---|---|---|
| 7,187,664 B2 * | 3/2007 | Hiltunen | H04B 1/109 370/318 |
| 8,160,523 B2 * | 4/2012 | Amano | H03J 1/0091 348/725 |

(Continued)

FOREIGN PATENT DOCUMENTS

| | | | |
|---|---|---|---|
| JP | 3-120915 A | 5/1991 |
| JP | 5-335855 A | 12/1993 |

(Continued)

OTHER PUBLICATIONS

International Search Report (PCT/ISA/210) issued in PCT/JP2016/065913, dated Jul. 12, 2016.

*Primary Examiner* — Quochien B Vuong
(74) *Attorney, Agent, or Firm* — Birch, Stewart, Kolasch & Birch, LLP (57) ABSTRACT

A broadcast station candidate determination unit (52) compares a reception condition of a radio wave with a first reception condition threshold to determine whether to set a frequency of the radio wave as a frequency of a radio broadcast station candidate. An interference station candidate identification unit (54) calculates and identifies a frequency of an intermodulation interference station candidate using a frequency of a strong electric field station. An interference station determination unit (55) compares a reception condition of a radio broadcast station candidate whose frequency is the same as that of an intermodulation interference station candidate with a second reception condition threshold indicating that a reception condition is better than the first reception condition threshold to determine whether the radio broadcast station candidate is an intermodulation interference station or a radio broadcast station.

7 Claims, 8 Drawing Sheets

(56) References Cited

U.S. PATENT DOCUMENTS

| | | | | |
|---|---|---|---|---|
| 8,339,520 B2* | 12/2012 | Maruyama | ........... | H04N 5/4401 |
| | | | | 348/706 |
| 8,391,512 B2* | 3/2013 | Minakawa | ............. | H04B 15/02 |
| | | | | 340/539.1 |
| 8,553,158 B2* | 10/2013 | Ishii | ......................... | H04N 5/50 |
| | | | | 348/731 |
| 9,043,858 B2* | 5/2015 | Kimura | .................. | H04H 60/42 |
| | | | | 725/132 |
| 10,278,156 B2* | 4/2019 | Kaufman | ............ | H04W 72/005 |

FOREIGN PATENT DOCUMENTS

| | | | |
|---|---|---|---|
| JP | 2007-129576 A | | 5/2007 |
| JP | 2009-105800 A | | 5/2009 |
| JP | 2013-38675 A | | 2/2013 |
| JP | 2013038675 A | * | 2/2013 |

\* cited by examiner

RADIO INTERFERENCE STATION ELIMINATION DEVICE, RECEIVER, AND RADIO INTERFERENCE STATION ELIMINATION METHOD

TECHNICAL FIELD

The present invention relates to a radio interference station elimination device for distinguishing an intermodulation interference station and a radio broadcast station from each other.

BACKGROUND ART

For example, Patent Literature 1 discloses a radio receiver handling, as a skip target for channel search, a channel predicted as an intermodulation interference wave appearing with source signals of a different intermodulation interference wave disposed between the intermodulation interference wave and the different intermodulation interference wave on a frequency spectrum in a case where a desired frequency channel as a search target is the different intermodulation interference wave.

CITATION LIST

Patent Literatures

Patent Literature 1: JP2013-38675A

SUMMARY OF INVENTION

Technical Problem

However, the control method as described in Patent Literature 1 does not perform determination to confirm whether a predicted intermodulation interference wave is an intermodulation interference wave as expected or a broadcast wave from a radio broadcast station actually. For this reason, for example, even though being actually a broadcast wave from a radio broadcast station, the predicted intermodulation interference wave is handled as an intermodulation interference wave for generating an intermodulation interference station, and handled as a skip target for channel search. That is, it may be impossible to appropriately distinguish the intermodulation interference station and the radio broadcast station from each other.

The present invention has been achieved in order to solve the problems described above, and an object of the present invention is to provide a radio interference station elimination device capable of accurately distinguishing an intermodulation interference station and a radio broadcast station from each other.

Solution to Problem

A radio interference station elimination device according to the present invention includes: a broadcast station candidate determination unit for comparing a reception condition of a radio wave with a first reception condition threshold to determine whether to set a frequency of the radio wave as a frequency of a radio broadcast station candidate; an interference station candidate identification unit for identifying a frequency of an intermodulation interference station candidate; and an interference station determination unit for comparing a reception condition of a radio broadcast station candidate whose frequency is the same as that of an intermodulation interference station candidate identified by the interference station candidate identification unit and which is determined by the broadcast station candidate determination unit with a second reception condition threshold indicating that a reception condition is better than the first reception condition threshold to determine whether the radio broadcast station candidate is an intermodulation interference station or a radio broadcast station.

Advantageous Effects of Invention

According to the present invention, by comparing a reception condition of a radio broadcast station candidate whose frequency is the same as that of an intermodulation interference station candidate with a second reception condition threshold indicating that a reception condition is better than a first reception condition threshold used for determining the radio broadcast station candidate, it is determined whether the radio broadcast station candidate is an intermodulation interference station or a radio broadcast station. Therefore, the intermodulation interference station and the radio broadcast station can be accurately distinguished from each other.

DESCRIPTION OF EMBODIMENTS

Hereinafter, in order to describe the present invention in more detail, embodiments of the present invention will be described with reference to the attached drawings.

First Embodiment

Figure 1:
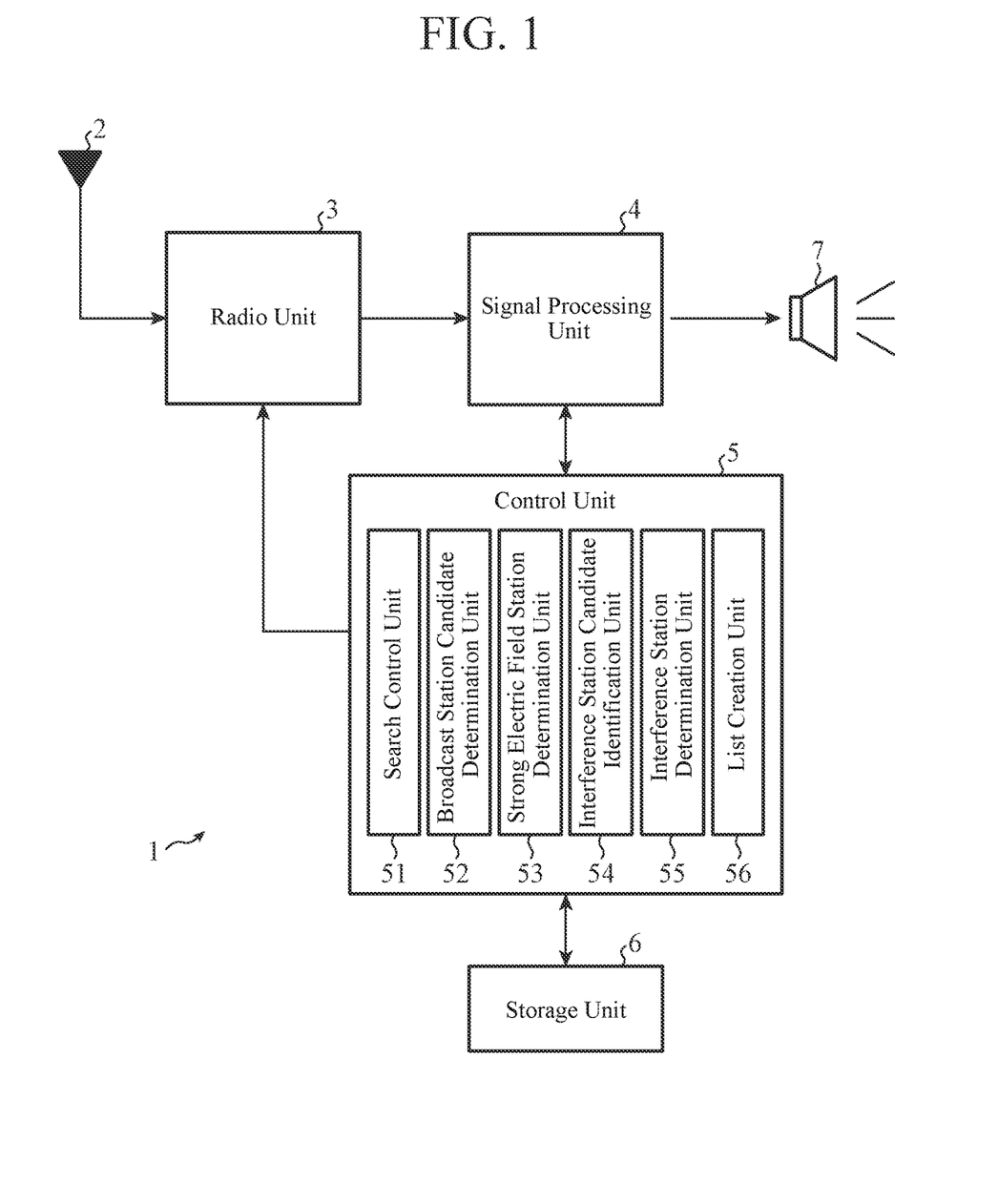
FIG. 1 is a diagram illustrating a configuration of a receiver according to a first embodiment of the present invention.

FIG. 1 illustrates a configuration of a receiver 1 according to a first embodiment of the present invention. The receiver 1 is a radio receiver for a moving body, mounted on a moving body and moving as the moving body moves. The moving body is, for example, a vehicle, a ship, an aircraft, a train, or a person who moves while carrying the receiver 1. The receiver 1 is implemented, for example, integrally with a car audio system equipped with a radio function or a car navigation device equipped with a radio function.

The receiver 1 includes an antenna 2, a radio unit 3, a signal processing unit 4, a control unit 5, a storage unit 6, and a speaker 7.

The antenna 2 receives a radio wave and outputs a radio frequency (RF) signal to the radio unit 3 as a reception signal.

Under control of the control unit 5, the radio unit 3 extracts a signal corresponding to a radio wave having a frequency instructed by the control unit 5 from RF signals output from the antenna 2, converts a frequency of the signal to an intermediate frequency, and outputs the converted signal to the signal processing unit 4 as an intermediate frequency (IF) signal.

The radio unit 3 is constituted by, for example, a digital radio tuner or an analog radio circuit.

The signal processing unit 4 demodulates the IF signal output from the radio unit 3 and outputs a sound signal to the speaker 7. In addition, the signal processing unit 4 calculates values such as an electric field level, an IF level, a multipath noise level, an adjacent interference level, and a modulation degree indicating a reception condition of a radio wave using the IF signal, and outputs the values to the control unit 5. For this purpose, the signal processing unit 4 includes a processing circuit for performing a well-known process for calculating these values indicating a reception condition of a radio wave.

A larger value of the electric field level indicates a stronger radio wave. A larger value of the IF level indicates that a frequency of an actually received radio wave deviates more largely from a frequency instructed by the control unit 5. A larger value of the multipath noise level indicates more multipath noise. A larger value of the adjacent interference level indicates more adjacent interference noise. A larger value of the modulation degree indicates a better modulation condition.

The signal processing unit 4 is constituted by, for example, a digital signal processor (DSP).

The control unit 5 includes a search control unit 51, a broadcast station candidate determination unit 52, a strong electric field station determination unit 53, an interference station candidate identification unit 54, an interference station determination unit 55, and a list creation unit 56, and controls each component of the receiver 1. A radio interference station elimination device includes the control unit 5.

During execution of a station list function or a seek function, the search control unit 51 outputs a control signal to the radio unit 3 so as to extract a signal corresponding to a radio wave having an instructed frequency. In this way, the search control unit 51 causes the radio unit 3 to select a station of the frequency.

Note that the station list function is a function of sequentially selecting a station of each frequency within a set band as a background process while a radio broadcast is provided to a user, and finding a radio broadcast station that can be provided to the user. As a result of the station list function, a list listing radio broadcast stations that can be provided is created. A user can find a radio broadcast station that can be provided, for example, by displaying the list on a screen. For the station list function, in the radio unit 3, a digital radio tuner or an analog radio circuit for sequentially selecting a station of each frequency is provided apart from a digital radio tuner or an analog radio circuit for continuously selecting a station currently providing sound to a user.

The station list function is periodically and repeatedly executed during operation of the receiver 1.

In addition, the seek function is a function of selecting a station while sequentially raising or lowering a frequency from the frequency of the station currently providing sound to a user, and finding a radio broadcast station that can be provided to the user. When a radio broadcast station that can be provided to a user is found, the seek function is ended in a state where the radio broadcast station is selected, and thereafter the radio broadcast station is provided to the user.

Execution of the seek function is started by an instruction by a user.

The broadcast station candidate determination unit 52 acquires a reception condition of a radio wave having a frequency corresponding to the station selected by using the search control unit 51 from the signal processing unit 4, and determines whether to set the frequency as a frequency of a radio broadcast station candidate using the reception condition. The radio broadcast station candidate refers to a station satisfying a determination condition using a first reception condition threshold described later to be a candidate for a radio broadcast station that can be provided to a user. The determination result is stored in the storage unit 6 or output to the interference station determination unit 55 or the search control unit 51.

The strong electric field station determination unit 53 acquires a reception condition of a radio wave having a frequency corresponding to the station selected by using the search control unit 51 from the signal processing unit 4, and determines whether the station is a strong electric field station using the reception condition. The strong electric field station generates an intermodulation interference station. The determination result is stored in the storage unit 6.

The interference station candidate identification unit 54 calculates and identifies a frequency of an intermodulation interference station candidate using a frequency of a station determined to be a strong electric field station by the strong electric field station determination unit 53. The intermodulation interference station is an interference station generated by two strong electric field stations, and the intermodulation interference station candidate refers to a station which may be an intermodulation interference station. The identification result is stored in the storage unit 6.

The interference station determination unit 55 determines whether the radio broadcast station candidate whose frequency is the same as that of the intermodulation interference station candidate identified by the interference station candidate identification unit 54 and which is determined by the broadcast station candidate determination unit 52 is an intermodulation interference station or a radio broadcast station. When a reception condition of a radio wave having a frequency of the radio broadcast station candidate satisfies a determination condition using a second reception condition threshold described later, the radio broadcast station candidate is determined to be a radio broadcast station. When the reception condition does not satisfy the determination condition, the radio broadcast station candidate is determined to be an intermodulation interference station. The determination result is stored in the storage unit 6 or output to the list creation unit 56 or the search control unit 51.

As a result of the station list function, the list creation unit 56 creates a list listing radio broadcast stations that can be provided. At this time, among the radio broadcast station candidates determined by the broadcast station candidate determination unit 52, radio broadcast station candidates other than the radio broadcast station candidate determined to be an intermodulation interference station by the interference station determination unit 55 are set as radio broadcast stations, and a list thereof is created. The created list is stored in the storage unit 6.

The storage unit 6 is written and read by the control unit 5.

Similarly to a memory 101 described later, the storage unit 6 is constituted by a random access memory (RAM), a read only memory (ROM), a flash memory, or the like.

The speaker 7 outputs sound corresponding to a sound signal output from the signal processing unit 4.

An example of a hardware configuration of the control unit 5 will be described with reference to each of FIGS. 2A and 2B.

The functions of the search control unit 51, the broadcast station candidate determination unit 52, the strong electric field station determination unit 53, the interference station candidate identification unit 54, the interference station determination unit 55, and the list creation unit 56 of the control unit 5 are implemented by a processing circuit. The processing circuit may be dedicated hardware or a central processing unit (CPU) for executing a program stored in a memory. CPU is also called a central processing device, a processing device, an arithmetic device, a microprocessor, a microcomputer, a processor, or a digital signal processor (DSP).

Figure 2A:
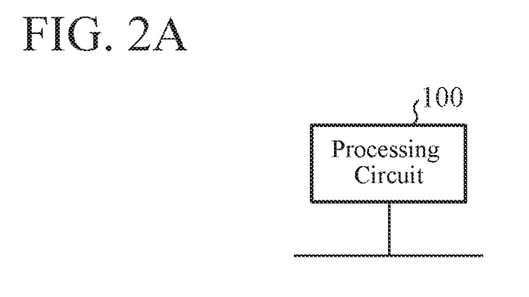
FIGS. 2A and 2B are diagrams each illustrating an example of a hardware configuration of a control unit of the receiver according to the first embodiment of the present invention.

FIG. 2A is a diagram illustrating an example of a hardware configuration in a case where the functions of the components of the control unit 5 are implemented by a processing circuit 100 which is dedicated hardware. To the processing circuit 100, for example, a single circuit, a composite circuit, a programmed processor, a parallel programmed processor, an application specific integrated circuit (ASIC), a field programmable gate array (FPGA), or a combination thereof corresponds. The functions of the search control unit 51, the broadcast station candidate determination unit 52, the strong electric field station determination unit 53, the interference station candidate identification unit 54, the interference station determination unit 55, and the list creation unit 56 may be implemented by combining two or more processing circuits 100 or by one processing circuit 100.

Figure 2B:
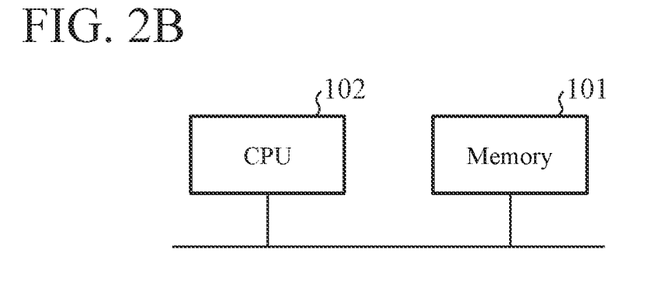

FIG. 2B is a diagram illustrating an example of a hardware configuration in a case where the functions of the components of the control unit 5 are implemented by a CPU 102 for executing a program stored in the memory 101. The memory 101 may constitute the storage unit 6. In this case, the functions of the search control unit 51, the broadcast station candidate determination unit 52, the strong electric field station determination unit 53, the interference station candidate identification unit 54, the interference station determination unit 55, and the list creation unit 56 are implemented by software, firmware, or a combination of software and firmware. The software and the firmware are each described as a program and stored in the memory 101. The CPU 102 reads and executes the program stored in the memory 101, and thereby implements the functions of the components of the control unit 5. That is, the control unit 5 includes the memory 101 for storing a program or the like for consequently executing steps described later and illustrated in the flowcharts of FIGS. 3, 4, 5, 7, and 8. In addition, it can also be said that these programs cause a computer to execute a procedure or a method of each component of the control unit 5. Here, to the memory 101, for example, a nonvolatile or volatile semiconductor memory such as RAM, ROM, a flash memory, erasable programmable ROM (EPROM), or electrically erasable programmable ROM (EEPROM), a magnetic disc, a flexible disc, an optical disc, a compact disc, a mini disc, a digital versatile disc (DVD), or the like corresponds.

Note that a part of the functions of the components of the control unit 5 may be implemented by dedicated hardware, and another part of the functions may be implemented by software or firmware. For example, the functions of the search control unit 51, the broadcast station candidate determination unit 52, and the strong electric field station determination unit 53 can be implemented by a processing circuit as dedicated hardware, and the functions of the interference station candidate identification unit 54, the interference station determination unit 55, and the list creation unit 56 can be implemented by reading and executing a program stored in a memory by a processing circuit.

As mentioned above, the processing circuit can implement each of the above-mentioned functions of the control unit 5 by using hardware, software, firmware, or a combination thereof.

Figure 4:
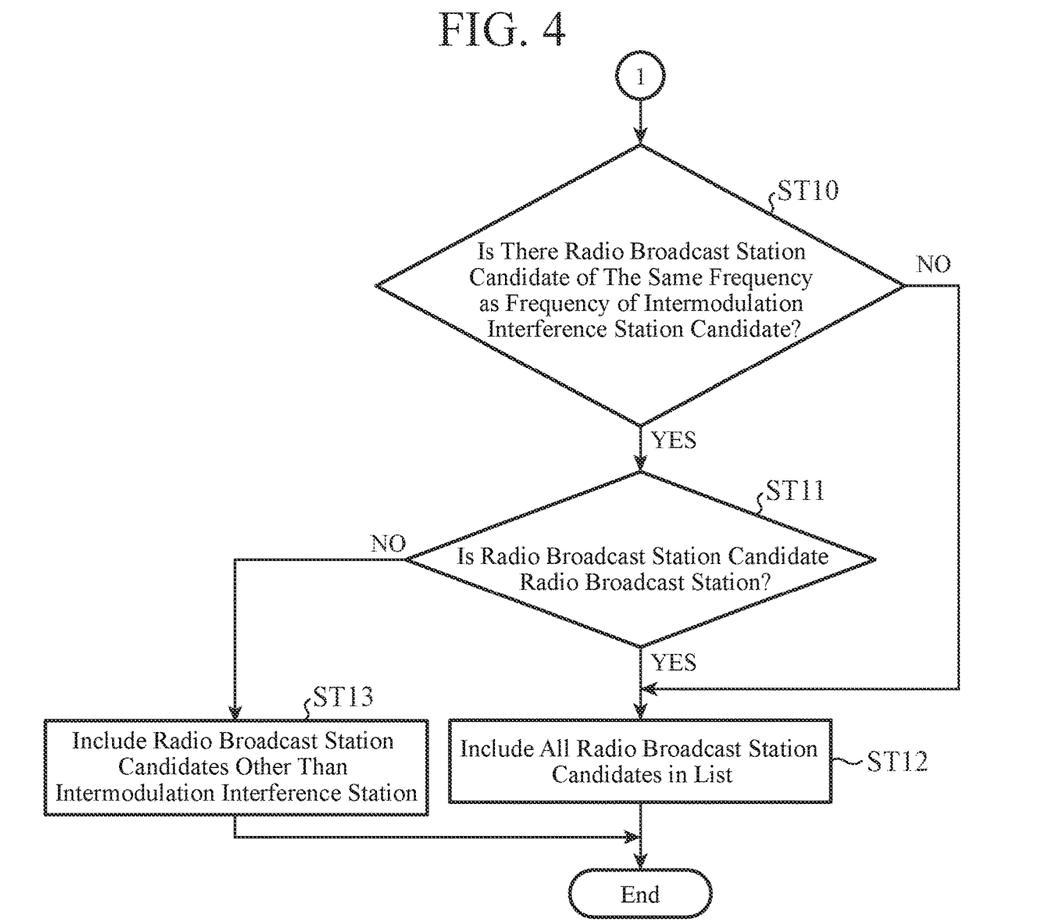
FIG. 4 is a flowchart illustrating a process of the receiver according to the first embodiment of the present invention, and illustrates a process when a station list function is executed.
Figure 5:
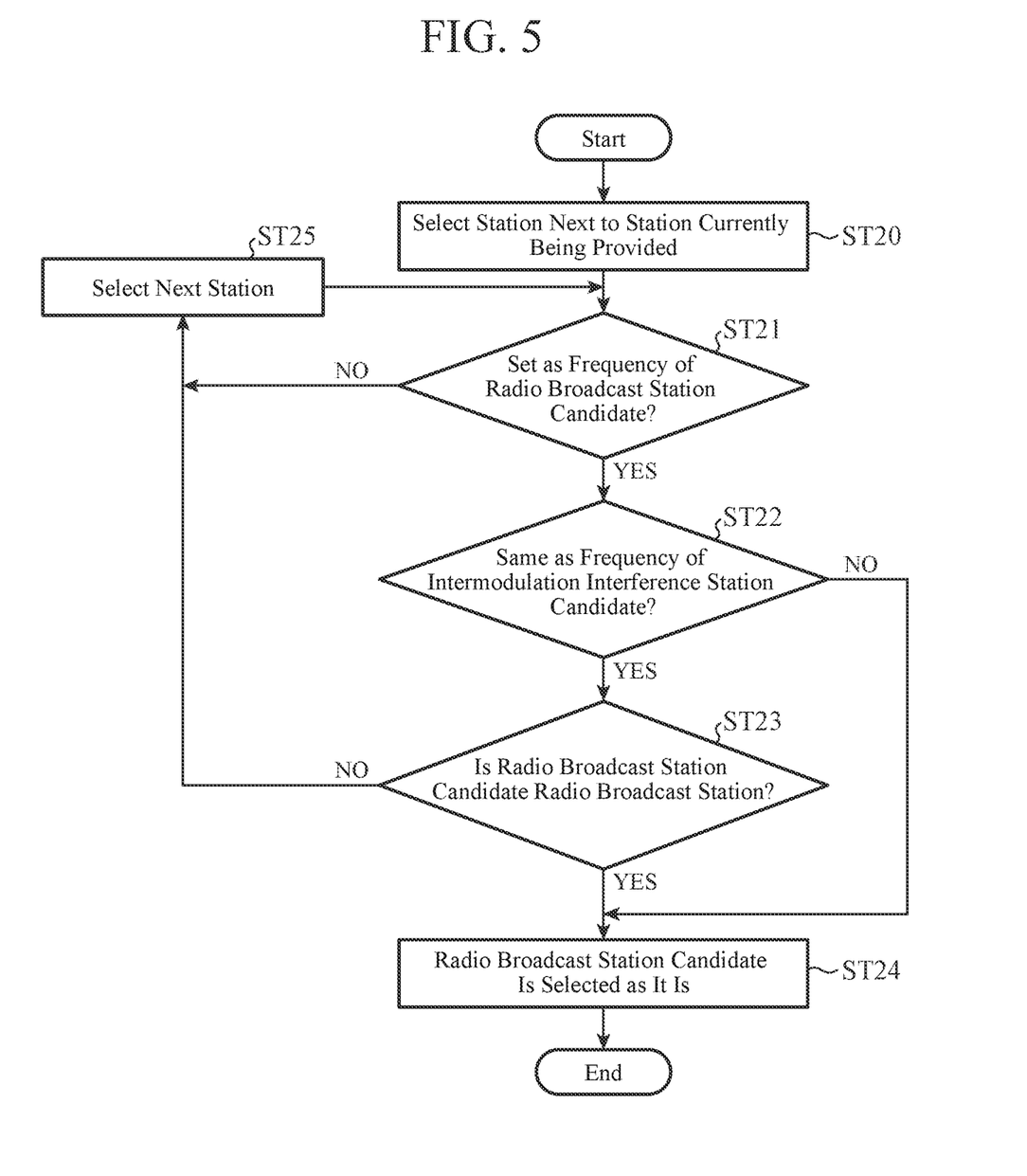
FIG. 5 is a flowchart illustrating a process of the receiver according to the first embodiment of the present invention, and illustrates a process when a seek function is executed.

Next, an example of a process by the receiver 1 configured as described above will be described with reference to the flowcharts illustrated in FIGS. 3 to 5.

First, with reference to FIGS. 3 and 4, a process when a station list function is executed will be described.

First, the search control unit 51 causes the radio unit 3 to select a station of a start frequency (step ST1). The start frequency is, for example, the lowest frequency within a set band, and this band is stored in advance in the storage unit 6.

Subsequently, the broadcast station candidate determination unit 52 determines whether to set the frequency as a frequency of a radio broadcast station candidate using a reception condition of a radio wave having the frequency corresponding to the station selected by using the search control unit 51 (step ST2). Specifically, the broadcast station candidate determination unit 52 acquires a reception condition of a radio wave, such as an electric field level, an IF level, a multipath noise level, or an adjacent interference level, from the signal processing unit 4, and compares the reception condition with the first reception condition threshold. For example, when a threshold of the electric field level is represented by A (dBuV), a threshold of the IF level is represented by ±B (kHz), a threshold of the multipath noise level is represented by C, and a threshold of the adjacent interference level is represented by D, it is determined whether the electric field level is equal to or more than A, the IF level is within ±B, the multipath noise level is equal to or less than C, and the adjacent interference level is equal to or less than D. If all the four determination conditions are satisfied, it is determined to set the frequency as the frequency of the radio broadcast station candidate.

Incidentally, if any one of the four determination conditions is satisfied, it may be determined to set the frequency as the frequency of the radio broadcast station candidate. Alternatively, if n or more conditions out of the four determination conditions are satisfied, it may be determined to set the frequency as the frequency of the radio broadcast station candidate. In this case, n is 2 or 3.

If the frequency is not set as the frequency of the radio broadcast station candidate (step ST2; NO), the process proceeds to step ST4 described later.

Meanwhile, if the frequency is set as the frequency of the radio broadcast station candidate (step ST2; YES), the broadcast station candidate determination unit 52 subsequently stores the station selected by using the search control unit 51 in the storage unit 6 as a radio broadcast station candidate (step ST3). At this time, a frequency of the selected station and a reception condition of a radio wave, such as an electric field level, an IF level, a multipath noise level, or an adjacent interference level, are stored.

Subsequently, the strong electric field station determination unit 53 determines whether the station selected by using the search control unit 51 is a strong electric field station (step ST4). Specifically, the strong electric field station determination unit 53 acquires an electric field level and a modulation degree from the signal processing unit 4 and compares the electric field level and the modulation degree with a strong electric field threshold. The electric field level and the modulation degree are related to a radio wave having a frequency of the station selected by using the search control unit 51. For example, when a threshold of the electric field level is represented by I (dBuV) and a threshold of the modulation degree is represented by J (%), it is determined whether the electric field level is equal to or more than I and the modulation degree is equal to or more than J. When the electric field level is equal to or more than I and the modulation degree is equal to or more than J, it is determined that the station is a strong electric field station. Note that the threshold I of the electric field level here is set to a value larger than the threshold A.

If the station is not a strong electric field station (step ST4; NO), the process proceeds to step ST6 described later.

Meanwhile, if the station is a strong electric field station (step ST4; YES), the strong electric field station determination unit 53 subsequently stores the station selected by using the search control unit 51 in the storage unit 6 as a strong electric field station (step ST5). At this time, a frequency of the selected station is stored.

Subsequently, the search control unit 51 determines whether the frequency of the station selected by the radio unit 3 is an end frequency (step ST6). The end frequency is, for example, the highest frequency within a set band.

If the frequency is not the end frequency (step ST6; NO), the search control unit 51 causes the radio unit 3 to select a next station (step ST7). For example, the search control unit 51 causes the radio unit 3 to select a station of a frequency raised by a predetermined value from the previously instructed frequency.

Meanwhile, if the frequency is the end frequency (step ST6; YES), the interference station candidate identification unit 54 refers to the storage unit 6 and determines whether two or more strong electric field stations are stored (step ST8).

If there are not two or more strong electric field stations (step ST8; NO), the process proceeds to step ST10 described later.

Meanwhile, if there are two or more strong electric field stations (step ST8; YES), the interference station candidate identification unit 54 calculates a frequency of an intermodulation interference station candidate (step ST9).

For example, when frequencies of the strong electric field stations are represented by F1 (MHz) and F2 (MHz), frequencies of the intermodulation interference station candidates Fx (MHz) and Fy (MHz) are calculated as in the following formulas (1) and (2).

$$Fx = 2F1 - F2 \quad (1)$$

$$Fy = 2F2 - F1 \quad (2)$$

Incidentally, when there are three or more strong electric field stations, Fx and Fy are calculated for each pair obtained by combining two strong electric field stations from the three or more strong electric field stations.

In this way, the frequency of the intermodulation interference station candidate is identified. The identified frequency of the intermodulation interference station candidate is stored in the storage unit 6.

Subsequently, the interference station determination unit 55 reads a radio broadcast station candidate obtained as a result of repeating steps ST1 to ST7 from the storage unit 6, and determines whether there is a radio broadcast station candidate of the same frequency as the intermodulation interference station candidate stored in the storage unit 6 (step ST10). Incidentally, here, frequencies may be determined to be the same not only when the frequencies are exactly the same but also when the frequencies have a difference within a setting error considering station selecting accuracy or the like of the receiver 1 from each other.

If there is no radio broadcast station candidate of the same frequency as the intermodulation interference station candidate (step ST10; NO), the process proceeds to step ST12 described later.

Meanwhile, if there is at least one radio broadcast station candidate of the same frequency as the intermodulation interference station candidate (step ST10; YES), the interference station determination unit 55 determines whether the radio broadcast station candidate is a radio broadcast station using a reception condition of the radio broadcast station candidate (step ST11). Specifically, the interference station determination unit 55 reads the reception condition of the radio broadcast station candidate from the storage unit 6 and compares the reception condition with the second reception condition threshold. For example, when a threshold of the electric field level is represented by E (dBuV), a threshold of the IF level is represented by ±F (kHz), a threshold of the multipath noise level is represented by G, and a threshold of the adjacent interference level is represented by H, it is determined whether the electric field level is equal to or more than E, the IF level is within ±F, the multipath noise level is equal to or less than G, and the adjacent interference level is equal to or less than H. If all the four determination conditions are satisfied, it is determined that the radio broadcast station candidate is a radio broadcast station.

The threshold E of the electric field level here is set to a value larger than the threshold A and smaller than the threshold I. The threshold ±F of the IF level is set to a value having an absolute value smaller than that of the threshold B. The threshold G of the multipath noise level is set to a value smaller than the threshold C. The threshold H of the adjacent interference level is set to a value smaller than the threshold D. That is, the second reception condition threshold indicating that the reception condition is better than the first reception condition threshold used in step ST2 is used in the determination in step ST11.

Incidentally, as in step ST2, if any one of the four determination conditions is satisfied, it may be determined that the radio broadcast station candidate is a radio broadcast station. Alternatively, if n or more conditions of the four determination conditions are satisfied, it may be determined that the radio broadcast station candidate is a radio broadcast station.

If there is no radio broadcast station candidate of the same frequency as the intermodulation interference station candidate (step ST10; NO), or if it is determined that all the radio broadcast station candidates are radio broadcast stations (step ST11; YES), subsequently, the list creation unit 56 creates a list of radio broadcast stations in which all the radio broadcast station candidates stored in the storage unit 6 are listed as radio broadcast stations (step ST12).

Meanwhile, if it is determined that at least one radio broadcast station candidate is not a radio broadcast station (step ST11; NO), that is, if it is determined that the radio broadcast station candidate is an intermodulation interference station, the list creation unit 56 creates a list of radio broadcast stations in which one or more radio broadcast station candidates other than the intermodulation interference station are listed as radio broadcast stations out of all the radio broadcast station candidates stored in the storage unit 6 (step ST13).

In this way, in step ST11, it is determined whether the station determined as an intermodulation interference station candidate in step ST9 is an intermodulation interference station as it is or a radio broadcast station actually. This makes it possible to accurately distinguish the intermodulation interference station and the radio broadcast station from each other, thus improving reliability of the list.

Next, with reference to FIG. 5, a process when the seek function is executed will be described.

When a user inputs an instruction to execute the seek function via an input unit (not illustrated), the search control unit 51 causes the radio unit 3 to stop selection of the station currently being provided to the user and to select a station next to the station (step ST20). For example, the search control unit 51 causes the radio unit 3 to select a station of a frequency raised by a predetermined value from the frequency of the station of which selection is stopped.

Subsequently, the broadcast station candidate determination unit 52 determines whether to set the frequency as a frequency of a radio broadcast station candidate using a reception condition of a radio wave having a frequency corresponding to the station selected by using the search control unit 51 (step ST21). Since the specific process is similar to that in step ST2, description thereof will be omitted.

If the frequency is not set as the frequency of the radio broadcast station candidate (step ST21; NO), the process proceeds to step ST25 described later.

Meanwhile, if the frequency is set as the frequency of the radio broadcast station candidate (step ST21; YES), subsequently, the interference station determination unit 55 determines whether the frequency is the same as the frequency of the intermodulation interference station candidate (step ST22). As the frequency of the intermodulation interference station candidate, a result obtained by the station list function can be read from the storage unit 6 and used. Incidentally, as in step ST10, frequencies may be determined to be the same not only when the frequencies are exactly the same but also when the frequencies have a difference within a setting error considering accuracy in selecting a station or the like of the receiver 1 from each other.

If the frequency is not the same as the frequency of the intermodulation interference station candidate (step ST22; NO), the process proceeds to step ST24 described later.

Meanwhile, if the frequency is the same as the frequency of the intermodulation interference station candidate (step ST22; YES), the interference station determination unit 55 determines whether the radio broadcast station candidate is a radio broadcast station using a reception condition of the radio broadcast station candidate having the same frequency as the intermodulation interference station candidate (step ST23). Since the specific process is similar to that in step ST11, description thereof will be omitted.

If the frequency is not the same as the frequency of the intermodulation interference station candidate (step ST22;
NO) or if it is determined that the radio broadcast station candidate is a radio broadcast station (step ST23; YES), the search control unit 51 ends the seek function in a state where the radio broadcast station candidate is selected as it is (step ST24). As a result, the radio broadcast station candidate is continuously selected thereafter and provided to a user.

Meanwhile, if the frequency is not set as the frequency of the radio broadcast station candidate (step ST21; NO), or if it is determined that the radio broadcast station candidate is not a radio broadcast station (step ST23; NO), that is, if it is determined that the radio broadcast station candidate is an intermodulation interference station, the search control unit 51 does not cause the radio unit 3 to continue selection of the station of the radio broadcast station candidate but causes the radio unit 3 to select a station next to the station currently being selected (step ST25).

In this way, in step ST23, it is determined whether the station determined as the intermodulation interference station candidate in step ST9 is an intermodulation interference station as it is or a radio broadcast station actually. This makes it possible to accurately distinguish the intermodulation interference station and the radio broadcast station from each other, and thus the seek function is ended in a state where the radio broadcast station is appropriately selected.

Figure 3:
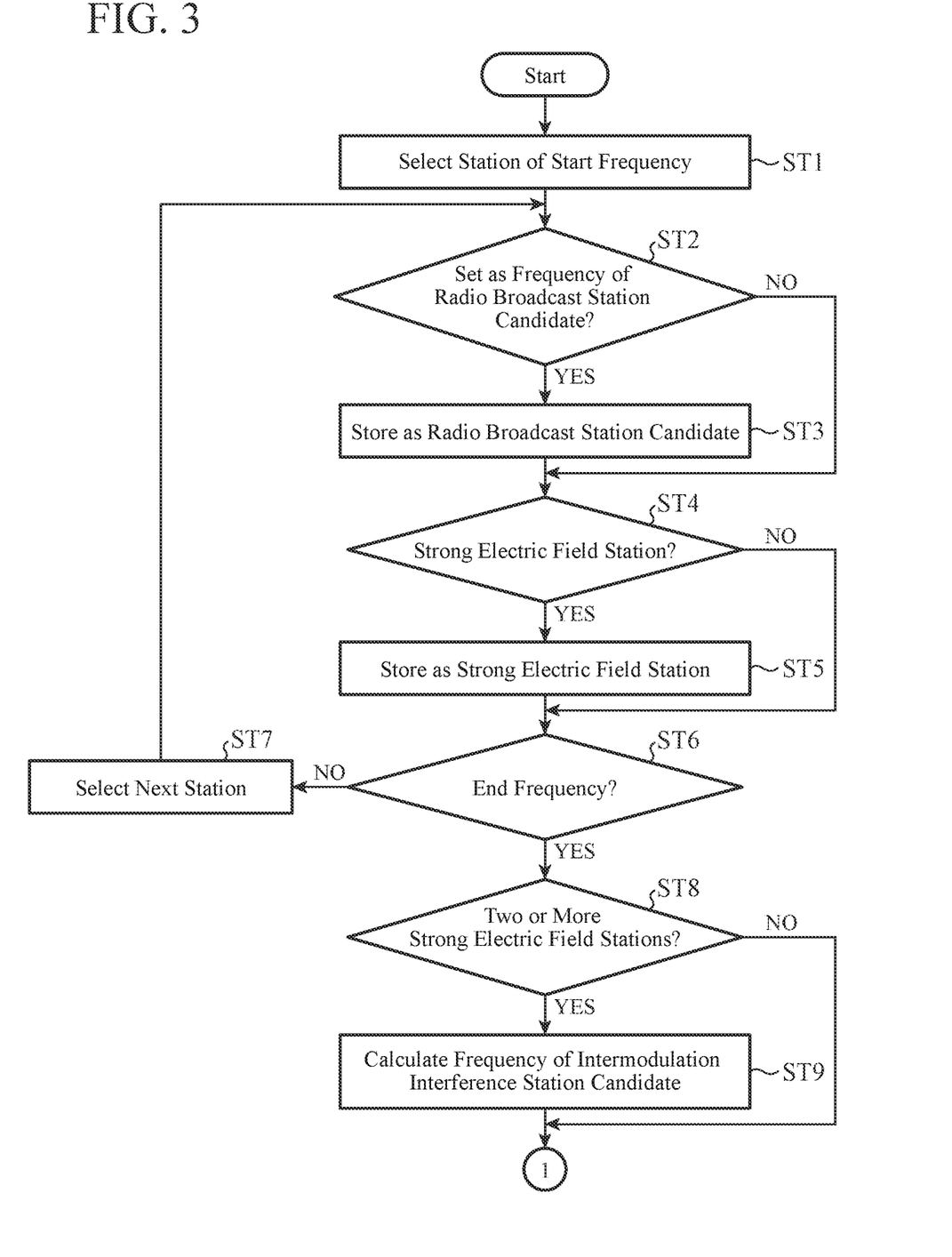
FIG. 3 is a flowchart illustrating a process of the receiver according to the first embodiment of the present invention, and illustrates a process when a station list function is executed.

Incidentally, in the above, the case where the interference station candidate identification unit 54 calculates the frequency of an intermodulation interference station candidate each time the station list function is executed once is illustrated by the flowchart of FIG. 3. However, each time the station list function is executed X times, the interference station candidate identification unit 54 may calculate the frequency of an intermodulation interference station candidate. X is an any positive integer equal to or more than 2. For example, in a case where X is 3, after the interference station candidate identification unit 54 calculates the frequency of an intermodulation interference station candidate, the interference station candidate identification unit 54 does not perform a process of calculating the frequency of an intermodulation interference station candidate during execution of a next station list function and a station list function after the next station list function.

As described above, the receiver 1 according to the first embodiment compares a reception condition of a radio broadcast station candidate whose frequency is the same as that of an intermodulation interference station candidate with the second reception condition threshold indicating that a reception condition is better than the first reception condition threshold used for determining the radio broadcast station candidate, and determines whether the radio broadcast station candidate is an intermodulation interference station or a radio broadcast station. Therefore, the intermodulation interference station and the radio broadcast station can be accurately distinguished from each other.

Second Embodiment

In the first embodiment, in the case where there are two or more strong electric field stations, the interference station candidate identification unit 54 calculates the frequency of the intermodulation interference station candidate using the frequencies of the strong electric field stations. In a second embodiment, a case where an interference station candidate identification unit 54 identifies the frequency of an intermodulation interference station candidate by another method will be described.

Figure 6:
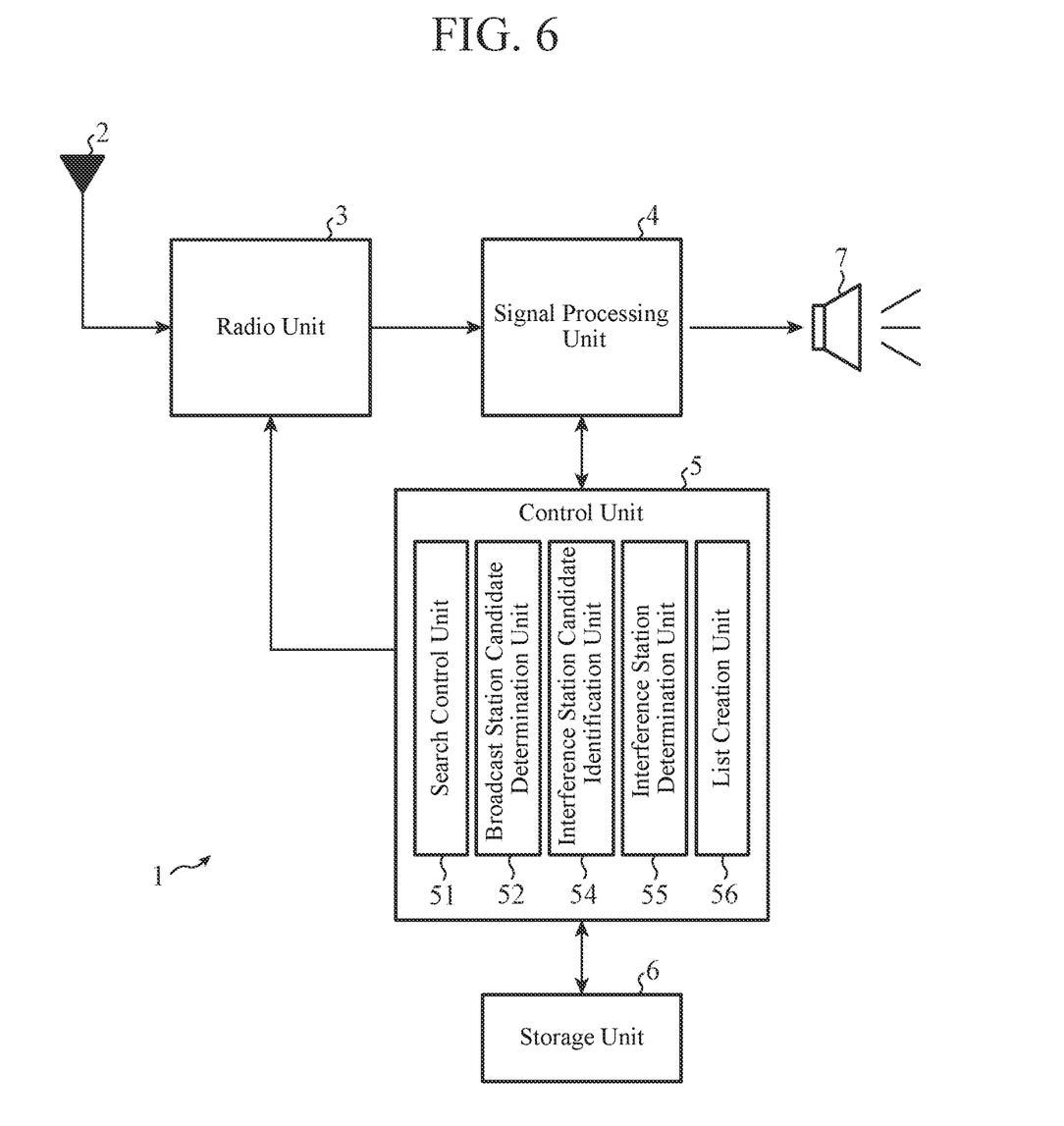
FIG. 6 is a diagram illustrating a configuration of a receiver according to a second embodiment of the present invention.

FIG. 6 illustrates a configuration of a receiver 1 according to the second embodiment of the present invention. Note that components having the same functions as or equivalent functions to those already described in the first embodiment will be denoted by the same reference numerals, and description thereof will be omitted or simplified.

The interference station candidate identification unit 54 identifies a frequency of a newly appearing radio broadcast station candidate among radio broadcast station candidates within a set band periodically acquired by execution of a station list function as a frequency of an intermodulation interference station candidate. Specifically, if the frequency set as the frequency of the radio broadcast station candidate by a broadcast station candidate determination unit 52 is not listed in a list created by a list creation unit 56 in execution of a previous station list function, the frequency is identified as the frequency of the intermodulation interference station candidate.

This is because the newly appearing radio broadcast station candidate not listed on the list created by the previous station list function may be an intermodulation interference station.

The frequency of the intermodulation interference station candidate identified by the interference station candidate identification unit 54 is output to an interference station determination unit 55.

Figure 7:
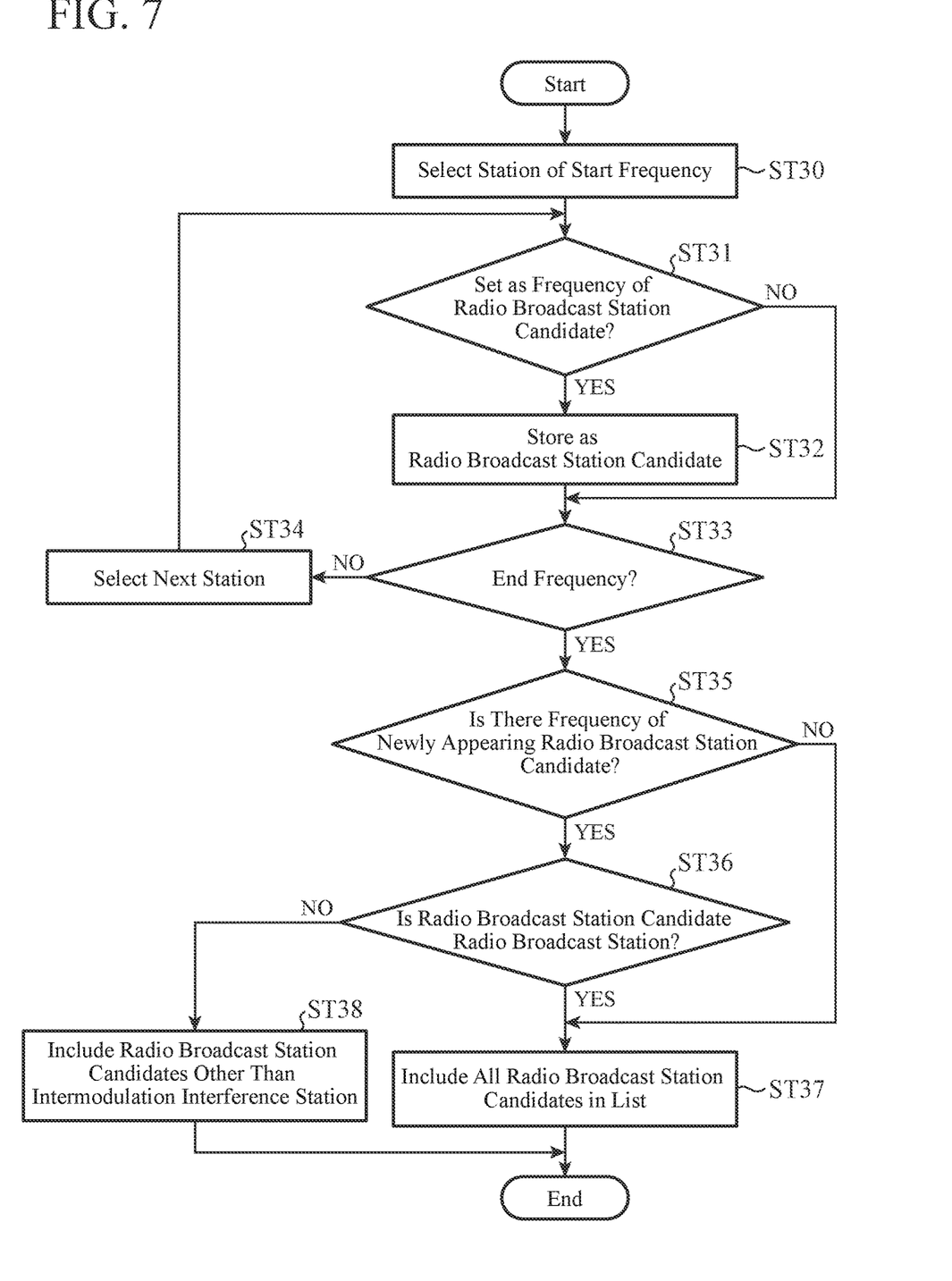
FIG. 7 is a flowchart illustrating a process of the receiver according to the second embodiment of the present invention, and illustrates a process when a station list function is executed.
Figure 8:
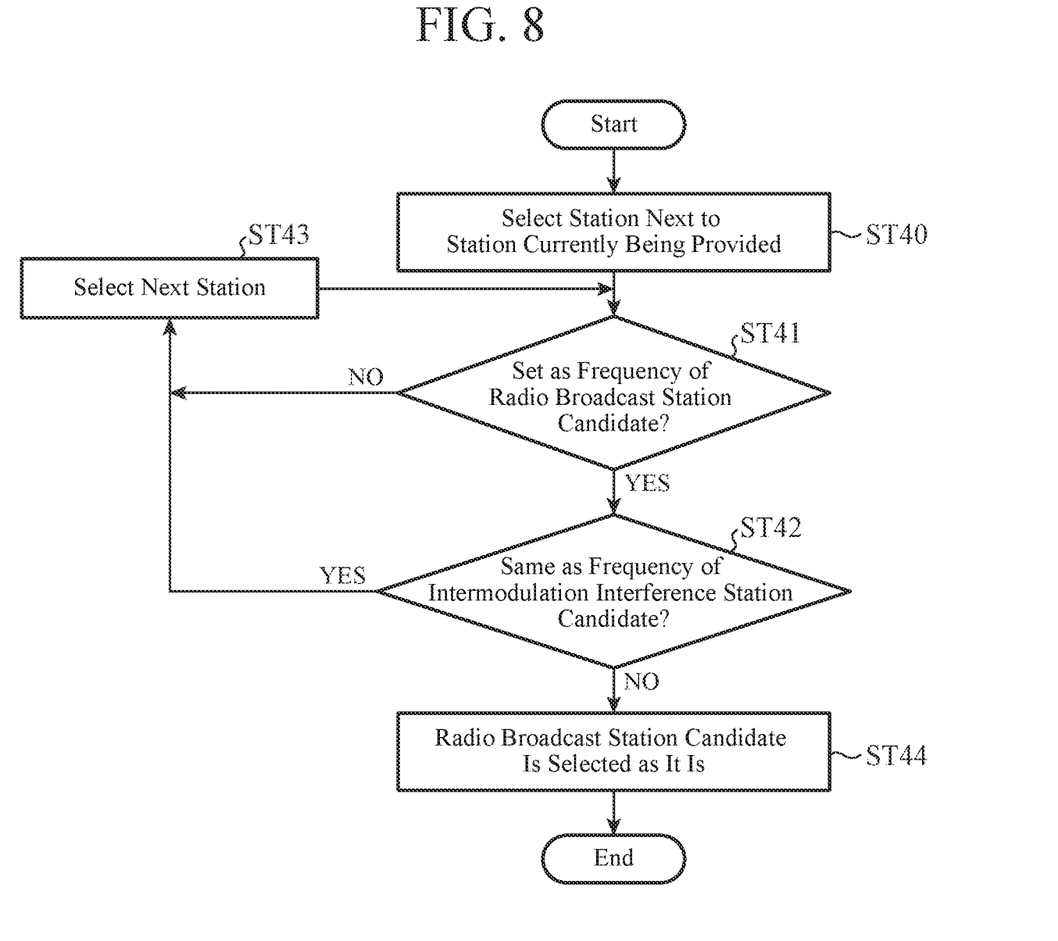
FIG. 8 is a flowchart illustrating a process of the receiver according to the second embodiment of the present invention, and illustrates a process when a seek function is executed.

Next, an example of a process by the receiver 1 configured as described above will be described with reference to the flowcharts illustrated in FIGS. 7 and 8.

First, with reference to FIG. 7, a process when the station list function is executed will be described.

First, a search control unit 51 causes a radio unit 3 to select a station of a start frequency (step ST30). Since the specific process is similar to that in step ST1, description thereof will be omitted.

Subsequently, the broadcast station candidate determination unit 52 determines whether to set the frequency as a frequency of a radio broadcast station candidate using a reception condition of a radio wave having a frequency corresponding to the station selected by using the search control unit 51 (step ST31). Since the specific process is similar to that in step ST2, description thereof will be omitted.

If the frequency is not set as the frequency of the radio broadcast station candidate (step ST31; NO), the process proceeds to step ST33 described later.

Meanwhile, if the frequency is set as the frequency of the radio broadcast station candidate (step ST31; YES), the broadcast station candidate determination unit 52 subsequently stores the station selected by using the search control unit 51 in a storage unit 6 as a radio broadcast station candidate (step ST32). At this time, a frequency of the selected station and a reception condition of a radio wave, such as an electric field level, an IF level, a multipath noise level, or an adjacent interference level, are stored.

Subsequently, the search control unit 51 determines whether the frequency of the station selected by the radio unit 3 is an end frequency (step ST33). Since the specific process is similar to that in step ST6, description thereof will be omitted.

If the frequency is not the end frequency (step ST33; NO), the search control unit 51 causes the radio unit 3 to select a next station (step ST34).

Meanwhile, if the frequency is the end frequency (step ST33; YES), the interference station candidate identification unit 54 reads the list stored in the storage unit 6, and compares the list with the frequency of the radio broadcast station candidate stored in the storage unit 6 by the process in step ST32. The list stored in the storage unit 6 is created by the previous station list function. The interference station candidate identification unit 54 determines whether there is a frequency of a newly appearing radio broadcast station candidate by a comparison process (step ST35). In this way, the frequency of the intermodulation interference station candidate is identified.

Incidentally, at this time, only if a reception condition of a radio wave having the frequency of the newly appearing radio broadcast station candidate indicates that the electric field level is equal to or more than z (dBuV), the frequency may be identified as the frequency of the intermodulation interference station candidate. z is set to any value close to the electric field level of a medium electric field station.

If there is no frequency of the newly appearing radio broadcast station candidate (step ST35; NO), the process proceeds to step ST37 described later.

Meanwhile, if there is at least one frequency of the newly appearing radio broadcast station candidate (step ST35; YES), the interference station determination unit 55 determines whether the radio broadcast station candidate is a radio broadcast station using a reception condition of the radio broadcast station candidate (step ST36). Since the specific process is similar to that in step ST11, description thereof will be omitted.

If there is no frequency of the newly appearing radio broadcast station candidate (step ST35; NO), or if it is determined that all the radio broadcast station candidates are radio broadcast stations (step ST36; YES), the list creation unit 56 creates a list of radio broadcast stations in which all the radio broadcast station candidates stored in the storage unit 6 are listed as radio broadcast stations (step ST37).

Meanwhile, if it is determined that at least one radio broadcast station candidate is not a radio broadcast station (step ST36; NO), that is, if it is determined that the radio broadcast station candidate is an intermodulation interference station, the list creation unit 56 creates a list of radio broadcast stations in which one or more radio broadcast station candidates other than the intermodulation interference station are listed as radio broadcast stations out of all the radio broadcast station candidates stored in the storage unit 6 (step ST38). In addition, in this case, the interference station determination unit 55 stores the frequency of the intermodulation interference station in the storage unit 6.

In this way, in step ST36, it is determined whether the station determined as an intermodulation interference station candidate in step ST35 is an intermodulation interference station as it is or a radio broadcast station actually. This makes it possible to accurately distinguish the intermodulation interference station and the radio broadcast station from each other, thus improving reliability of the list.

Next, with reference to FIG. 8, a process when a seek function is executed will be described.

When a user inputs an instruction to execute the seek function via an input unit (not illustrated), the search control unit 51 causes the radio unit 3 to stop selection of the station currently being provided to the user and to select a station next to the station (Step ST40). Since the specific process is similar to that in step ST20, description thereof will be omitted.

Subsequently, the broadcast station candidate determination unit 52 determines whether to set the frequency as a frequency of a radio broadcast station candidate using a reception condition of a radio wave having a frequency corresponding to the station selected by using the search control unit 51 (step ST41). Since the specific process is similar to that in step ST2, description thereof will be omitted.

If the frequency is not set as the frequency of the radio broadcast station candidate (step ST41; NO), the process proceeds to step ST43 described later.

Meanwhile, if the frequency is set as the frequency of the radio broadcast station candidate (step ST41; YES), subsequently, the search control unit 51 determines whether the frequency is the same as the frequency of the intermodulation interference station (step ST42). As the frequency of the intermodulation interference station, a result obtained by the station list function can be read from the storage unit 6 and used. Incidentally, here, frequencies may be determined to be the same not only when the frequencies are exactly the same but also when the frequencies have a difference within a setting error considering station selecting accuracy or the like of the receiver 1 from each other.

If the frequency is not set as the frequency of the radio broadcast station candidate (step ST41; NO) or if the frequency is the same as the frequency of the intermodulation interference station (step ST42; YES), the search control unit 51 does not cause the radio unit 3 to continue selection of the station of the radio broadcast station candidate but causes the radio unit 3 to select a station next to the station currently being selected (step ST43).

Meanwhile, if the frequency is not the same as the frequency of the intermodulation interference station (step ST42; NO), the search control unit 51 ends the seek function in a state where the radio broadcast station candidate is selected as it is (step ST44). As a result, the radio broadcast station candidate is continuously selected thereafter and provided to a user.

In this way, a result of determining whether the station determined as an intermodulation interference station candidate by the process in step ST35 is an intermodulation interference station as it is or a radio broadcast station actually in step ST36 is used in step ST42. This makes it possible to accurately distinguish the intermodulation interference station and the radio broadcast station from each other, and thus the seek function is ended in a state where the radio broadcast station is appropriately selected.

Incidentally, when the seek function is executed, the search control unit 51 may first reads a frequency of the intermodulation interference station from the storage unit 6. In this case, when the frequency is the same as a frequency to be instructed to the radio unit 3, the search control unit 51 may immediately instruct a frequency next to the frequency to the radio unit 3 without instructing the frequency.

In addition, in the above, the receiver 1 according to the second embodiment is configured without providing a strong electric field station determination unit 53. However, the strong electric field station determination unit 53 may be provided also in the receiver 1 according to the second embodiment. In this case, the interference station candidate identification unit 54 may not only identify a frequency of the intermodulation interference station candidate as in step ST35 but also identify a frequency of the intermodulation interference station candidate using a frequency of a strong electric field station as in formulas (1) and (2).

As described above, as in the first embodiment, the receiver 1 according to the second embodiment compares a reception condition of a radio broadcast station candidate whose frequency is the same as that of an intermodulation interference station candidate with a second reception condition threshold indicating that a reception condition is better than a first reception condition threshold used for determining the radio broadcast station candidate, and determines whether the radio broadcast station candidate is an intermodulation interference station or a radio broadcast station. Therefore, the second embodiment can obtain a similar effect to the first embodiment.

In addition, the receiver 1 includes the list creation unit 56 for creating a list of radio broadcast stations in which one or more radio broadcast station candidates other than the radio broadcast station candidate determined to be an intermodulation interference station by the interference station determination unit 55 are set as radio broadcast stations. In this way, the intermodulation interference station is eliminated from the list provided to a user by the station list function, and therefore convenience for the user is improved.

In addition, the receiver 1 includes the search control unit 51 for preventing the radio broadcast station candidate determined to be the intermodulation interference station by the interference station determination unit 55 from continuously being selected when the seek function is executed. In this way, selection of the intermodulation interference station is not continued during the seek function, and therefore convenience for a user is improved.

Note that the present invention can freely combine the embodiments with each other, modify any constituent element in each of the embodiments, or omit any constituent element in each of the embodiments within the scope of the invention.

INDUSTRIAL APPLICABILITY

As described above, the radio interference station elimination device according to the present invention can accurately distinguish the intermodulation interference station and the radio broadcast station from each other, and therefore is suitably used for being mounted on a vehicle or the like moving in a strong electric field region.

REFERENCE SIGNS LIST

1: Receiver, 2: Antenna, 3: Radio unit, 4: Signal processing unit, 5: Control unit, 6: Storage unit, 7: Speaker, 51: Search control unit, 52: Broadcast station candidate determination unit, 53: Strong electric field station determination unit, 54: Interference station candidate identification unit, 55: Interference station determination unit, 56: List creation unit, 100: Processing circuit, 101: Memory, 102: CPU

The invention claimed is:

1. A radio interference station elimination device comprising:
a broadcast station candidate determination unit for comparing a reception condition of a radio wave with a first reception condition threshold to determine whether to set a frequency of the radio wave as a frequency of a radio broadcast station candidate;
an interference station candidate identification unit for identifying a frequency of an intermodulation interference station candidate, and
an interference station determination unit for comparing a reception condition of a radio broadcast station candidate whose frequency is same as that of an intermodulation interference station candidate identified by the interference station candidate identification unit and which is determined by the broadcast station candidate determination unit with a second reception condition threshold indicating that a reception condition is better than the first reception condition threshold to determine whether the radio broadcast station candidate is an intermodulation interference station or a radio broadcast station.

2. The radio interference station elimination device according to claim 1, wherein the interference station candidate identification unit calculates and identifies a frequency of an intermodulation interference station candidate using frequencies of two strong electric field stations.

3. The radio interference station elimination device according to claim 1, wherein the interference station candidate identification unit identifies a frequency of a newly appearing radio broadcast station candidate among radio broadcast station candidates within a set band periodically acquired as a frequency of an intermodulation interference station candidate.

4. The radio interference station elimination device according to claim 1, further comprising a list creation unit for creating a list of radio broadcast stations in which one or more radio broadcast station candidates other than a radio broadcast station candidate determined to be an intermodulation interference station by the interference station determination unit are set as radio broadcast stations.

5. The radio interference station elimination device according to claim 1, further comprising a search control unit for preventing a radio broadcast station candidate determined to be an intermodulation interference station by the interference station determination unit from continuously being selected when a seek function is executed.

6. A receiver for a moving body, comprising the radio interference station elimination device according to claim 1.

7. A radio interference station elimination method comprising:
a broadcast station candidate determination step in which a broadcast station candidate determination unit compares a reception condition of a radio wave with a first reception condition threshold to determine whether to set a frequency of the radio wave as a frequency of a radio broadcast station candidate;
an interference station candidate identification step in which an interference station candidate identification unit identifies a frequency of an intermodulation interference station candidate; and
an interference station determination step in which an interference station determination unit compares a reception condition of a radio broadcast station candidate whose frequency is same as that of an intermodulation interference station candidate identified in the interference station candidate identification step and which is determined in the broadcast station candidate determination step with a second reception condition threshold indicating that a reception condition is better than the first reception condition threshold to determine whether the radio broadcast station candidate is an intermodulation interference station or a radio broadcast station.

* * * * *